United States Patent [19]
Miller

[11] Patent Number: 5,812,214
[45] Date of Patent: *Sep. 22, 1998

[54] APPARATUS AND METHOD FOR COMPOSITING VIDEO IMAGES

[75] Inventor: Robert L. Miller, Grass Valley, Calif.

[73] Assignee: Sierra Video Systems, Inc., Grass Valley, Calif.

[ * ] Notice: This patent issued on a continued prosecution application filed under 37 CFR 1.53(d), and is subject to the twenty year patent term provisions of 35 U.S.C. 154(a)(2).

[21] Appl. No.: 616,146

[22] Filed: Mar. 14, 1996

[51] Int. Cl.$^6$ .............................. H04N 9/75; H04N 9/74
[52] U.S. Cl. ......................... 348/587; 348/586; 348/592
[58] Field of Search ..................... 348/587, 586, 348/591, 592, 593; H04N 9/75, 9/74

[56] References Cited

U.S. PATENT DOCUMENTS

| | | | |
|---|---|---|---|
| 5,202,762 | 4/1993 | Fellinger | 358/183 |
| 5,270,820 | 12/1993 | Fellinger | 358/163 |
| 5,321,424 | 6/1994 | Alelyunas | 345/199 |
| 5,382,980 | 1/1995 | Gehrmann | 348/591 |
| 5,424,781 | 6/1995 | Vlahos | 348/587 |
| 5,455,633 | 10/1995 | Gehrmann | 348/587 |
| 5,500,684 | 3/1996 | Uya | 348/592 |
| 5,539,475 | 7/1996 | Sadjadian et al. | 348/591 |
| 5,608,466 | 3/1997 | Nakamoto | 348/587 |

OTHER PUBLICATIONS

Product Brochure of Sierra Video Systems entitled Video Keyers, Mixers and Format Converters, copyright notice 1994, pp. 1–4.

Primary Examiner—Glenton B. Burgess
Attorney, Agent, or Firm—Lothrop & West

[57] ABSTRACT

An apparatus and method effecting a linear color transformation between foreground video and insert video, in a chroma key video image. A determination is made whether a particular pel, or pixel in the foreground video image is either a full foreground pel, a full blue screen pel, or a transition pel. Predetermined "look up" tables store color values in vectorscope domain which correspond to endpoint UV foreground and endpoint full background UV blue values, for each foreground to background transition pel. A key signal related to the percent distance of each such transition pel from these two endpoints in the UV plane is created. The composite output pel is formed from the current YUV transition pel value, by subtracting the selected full blue YUV from it, and adding insert video to it in proportion to the key signal. Three methods are disclosed to determine whether the UV value of a current pel, or alternatively the UV values of pels within a spatial neighborhood of the current pel, identify the current pel as a transition pel. If so, the methods select and store full foreground and full blue transition color value endpoints, so an appropriate key signal for the composite output pel can be generated.

18 Claims, 10 Drawing Sheets

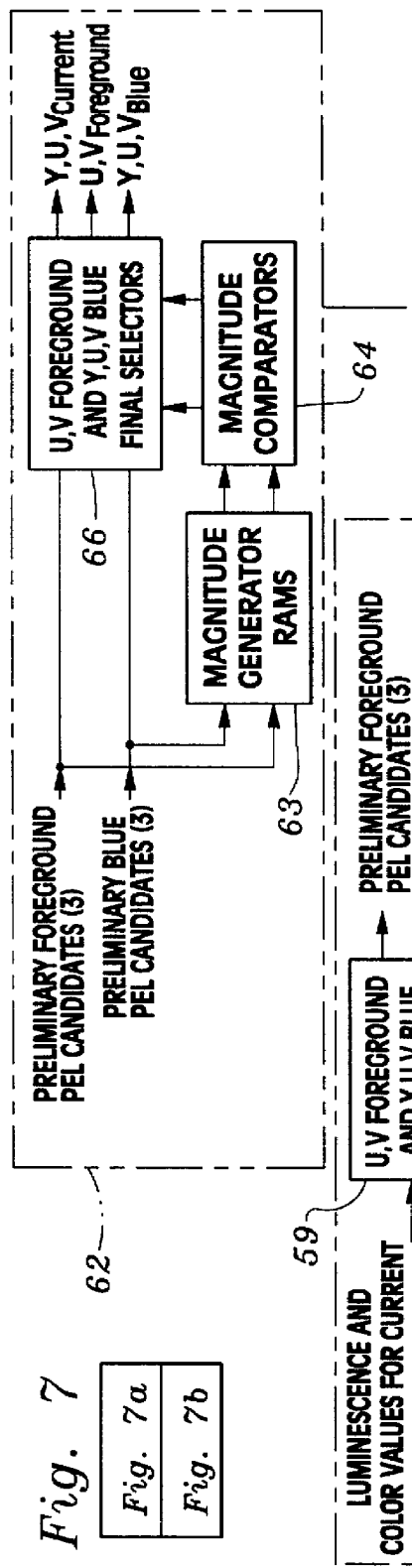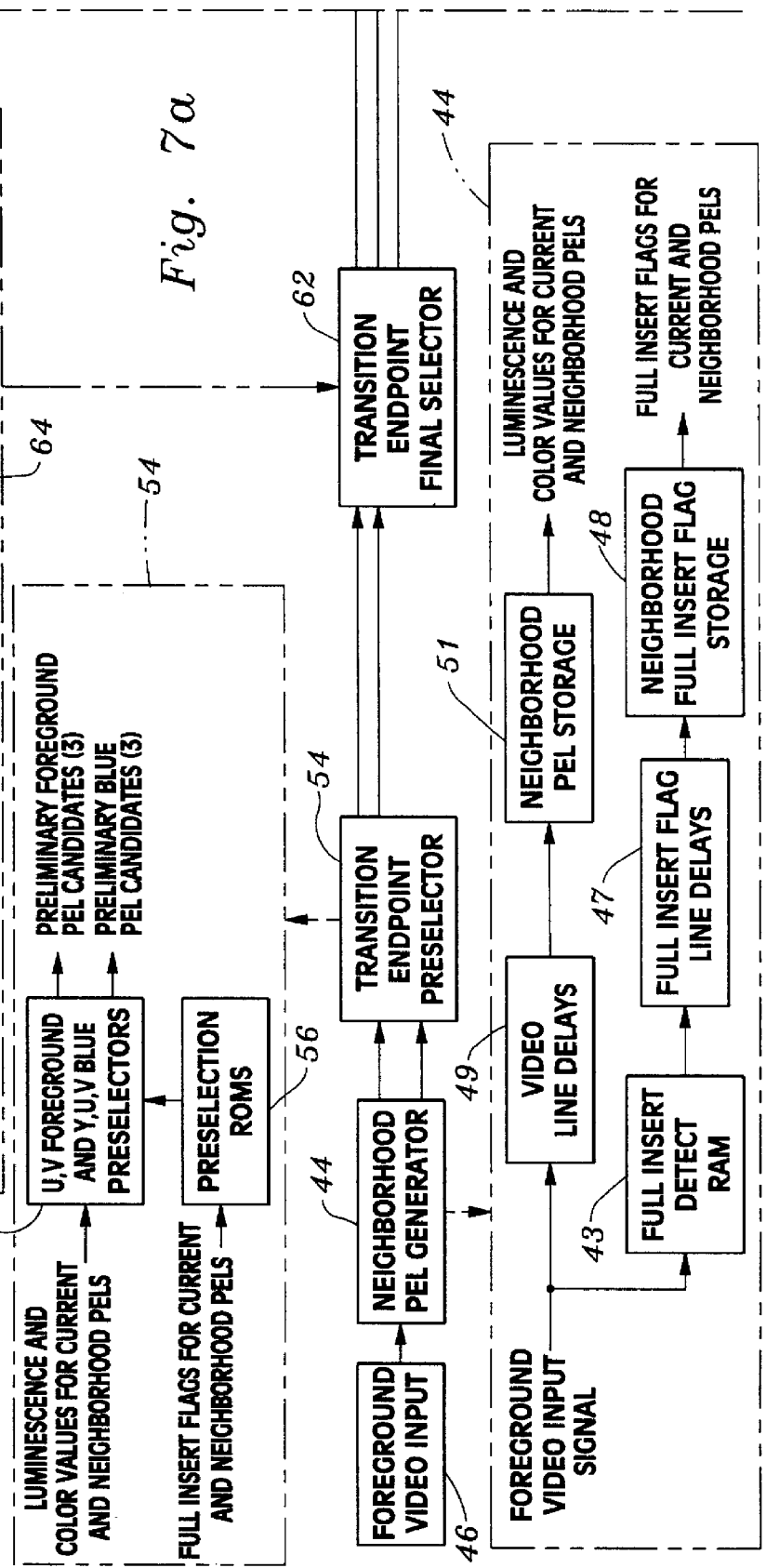
Fig. 7
| Fig. 7a |
|---|
| Fig. 7b |

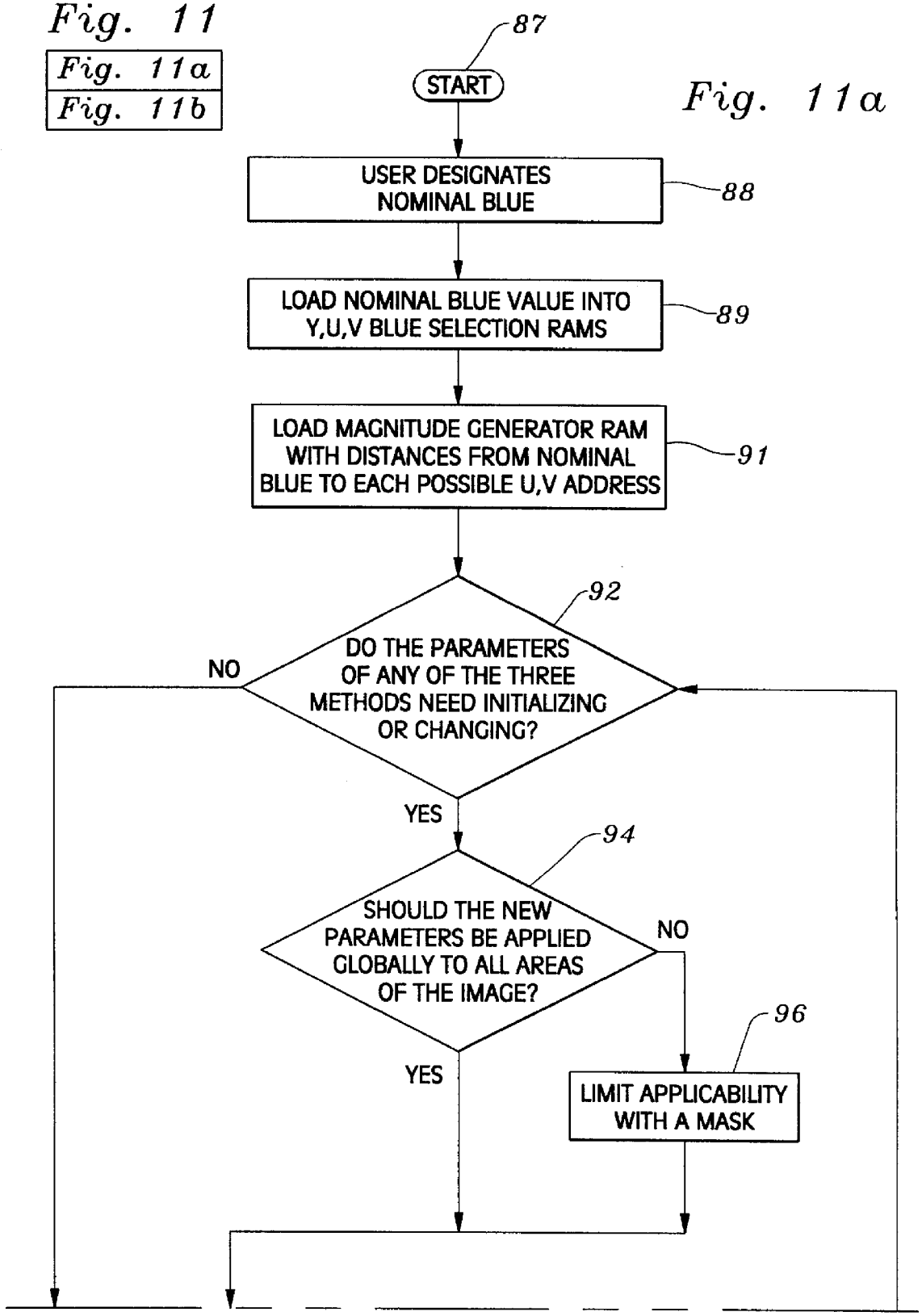

APPARATUS AND METHOD FOR COMPOSITING VIDEO IMAGES

FIELD OF THE INVENTION

The invention relates generally to the field of video image processors, able to produce special effects such as chroma key, color matte, or blue scene matte. More specifically, the invention pertains to a computer-driven, digital video keyer apparatus, providing linear transformation in a composite video image, from foreground video to insert video; the invention further includes three methods for implementing the foreground to insert video linear transformation.

BACKGROUND OF THE INVENTION

Chroma key video processing is well known in the prior art. Essentially, video from one source, called a foreground image, is electronically mixed with video from another source, termed an insert video image. The foreground image typically includes one or more objects in front of an entirely blue screen, or background. The insert video image is usually a standard, full video image of any scene, selected in some way to complement, or complete, the foreground image. For example, a foreground image may include a weather forecaster in front of a blue backdrop, and the insert video image may be a weather map, a satellite photo, or meteorological data.

To mix the two images into a composite image, processing circuitry produces a "key signal" which electronically removes the blue screen background of the foreground image, and replaces it with corresponding portions of the insert video image. The resultant composite image, resembles a full overlay of the foreground image over the insert video image so that the two images appear as one scene.

Prior art chroma key processors use hue, clip, and gain controls to position two transition thresholds in the B-Y (hereinafter, "U") and R-Y (hereinafter, "V") color difference plane. This plane is represented visually by means of a vectorscope. The two transition thresholds are typically shown on the vectorscope as two spaced lines, arranged in parallel relation. The first transition threshold is called the full foreground limit, and the second transition threshold is called the full insert limit. A hue control axis is represented as a line extending from the center of the vectorscope screen, which intersects the limit lines in perpendicular fashion.

The hue control establishes the radial direction of the hue control axis. The clip and gain controls respectively determine the spacing of the full foreground and full insert limits, perpendicular to the hue axis. By manipulating these controls, the operator can generally determine what color values will be used in the region of the composite video image, which transitions from foreground video to insert video.

On one side of the full foreground limit line, remote from the full insert line, substantially all of the color values of the objects in the foreground image are contained. On one side of the full insert line, remote from the full foreground limit, substantially all of the color values of the blue screen are contained. When the composite video is produced, the foreground video which includes the color values delineated by the full foreground line limit, remains unchanged; and, the foreground video which includes the blue screen values is replaced by insert video.

The area between the two limit lines is called the key signal linear region. It is in this region where the transition color values should lie. These values correspond to edges of the objects in the foreground video. When the composite video is produced, these transition color values are replaced by a mixture of foreground and insert video.

The problem with the prior art chroma key systems, is the inability to effect a linear transformation of all the color values which exist in the transition region between the foreground and insert video. Where transition color values lie outside the key signal linear region, particularly a problem with highly saturated yellow and red objects, the prior art chroma key systems are unable to effect a proper transition. In the resultant composite video, this non-linear transformation manifests itself as aberrant color fringing around the foreground video, in the transition region.

The manner in which prior art systems generate and use the chroma key signal is the essential reason for this non-linearity. Prior art systems derive the key signal from the amount of blue in the foreground signal. Then, proportioning multipliers based upon the key signal are used in a mathematical formula to subtract out a proportionate amount of the foreground signal and add a proportionate amount of insert signal. Because the foreground color values within the transition region, as detected by the video camera, have already shifted toward blue values, the proportioning multipliers effect yet a further reduction in the already-reduced foreground signal values. As a consequence, the blue values are not reduced sufficiently and the foreground color values are reduced too quickly.

Even in certain other prior art systems which do not use the foreground signal in the proportioning multipliers, the method used to generate the key signal has a limited linear range which cannot encompass all of the transition color values. Thus, there exists a need for an improved chroma key apparatus, which can effect a smooth and linear transition so that a realistic composite image can be formed from images containing any color values.

SUMMARY OF THE INVENTION

The computer-driven apparatus herein generates a key signal which transitions in linear fashion, the entire range of color values between the foreground image and the background image. This key signal is applied in proportioning multipliers which act only upon the full insert and the full blue, background values, adding to and subtracting respective values from the original foreground. Since the original foreground values do not go through the proportioning multipliers, its linear contribution to the transition is preserved, eliminating color fringing around objects and producing an ideal foreground to insert transition in the composite image.

Three related methods are disclosed herein to carry out the new chroma key process. All methods require that a first determination be made if a particular pel, or pixel, is a transition pel, or not. If it is a transition pel, then a key signal is generated based upon what color difference values the pel, or pixel "came from" and what color difference values the pel is "going to", in the color transition process. Then, that key signal is used in a video compositor, which determines how much of the background blue is to be subtracted out and replaced by insert video, and then mixed with the foreground video signal to produce the composite transition pel.

The first method generates a key signal based upon color difference values which exist in the immediate area, or neighborhood, around each pel. The color difference values, existing in the U,V plane, or vectorscope domain, are collected and temporarily stored. Color values of the foreground image and the blue background within a localized region are compared and analyzed, to determine appropriate range endpoints for the color transition. From the U,V foreground and Y,U,V blue values selected, an accurate key signal for that particular pel is generated. This first method is most useful in rapid color difference transitions, where a sharp outline or delineation defines the foreground image.

The second method requires that the user create, in vectorscope domain, a closed polygon boundary, which defines the metes and bounds of the color values for transition pels or pixels in the foreground image. The intersection of the boundary line with a radial drawn from a nominal blue value through the U,V value for each U,V transition pel is a corresponding full foreground image value. The key signal is generated by determining the differences in distances between: (1) the current, transition pel and the boundary intersection point on the polygon; and, (2) a nominal blue value within the polygon and the boundary intersection on the polygon. The second method is favored where the transition between the full foreground object and the blue background is gradual or diffuse.

The third method requires that the user spatially generate a box or rectangle on the video monitor, displaying the foreground image. The box or rectangle typically encloses part of the full foreground object, a transition region, and a blue background area. A full foreground value is then designated as the farthest pel from nominal blue in U,V domain. All color values in the foreground image within a predetermined radius of the values in the box are designated as the corresponding transition pels. The key signal is then generated using the respective distance determinations between a transition pel, the full foreground, and the nominal blue values. Method three is most useful when limited by a mask to a specific area of the image since the same Y,U,V values designated as transition pel values are likely to occur at other places in the image where they should not be treated as transition pels.

The three methods may be used either individually, or jointly. If implemented jointly, logic circuitry in the computer's software is used to select the U,V data which will produce the widest transition range for generating the key signal. Thus, in cases where methods 1, 2, and 3 produce different U,V foreground and U,V blue values for the same U,V transition value, the logic circuitry will select the U,V foreground value which lies farthest from nominal blue.

BRIEF DESCRIPTION OF THE DRAWINGS

FIGS. 7(a) and 7(b) are interrelated functional block diagrams for carrying out the first method, with details of certain procedures being shown within broken line boxes for further clarification;

FIGS. 11(a)–11(b) are interrelated software flow chart diagrams showing the steps for using the first, second, and third methods in integrated fashion.

DETAILED DESCRIPTION OF THE PREFERRED EMBODIMENT

In the present invention, an essential step is the generation of a key signal for each transition pel which is most appropriate to effect a linear transition between the full foreground object and the full blue background screen. To accomplish the linear transition step, the present invention selects two endpoint color difference values which relate to the location of the transition pel within a U,V (or B-Y and R-Y) vectorscope domain. This domain will also interchangeably be referred to herein as the U,V plane.

Figure 1:
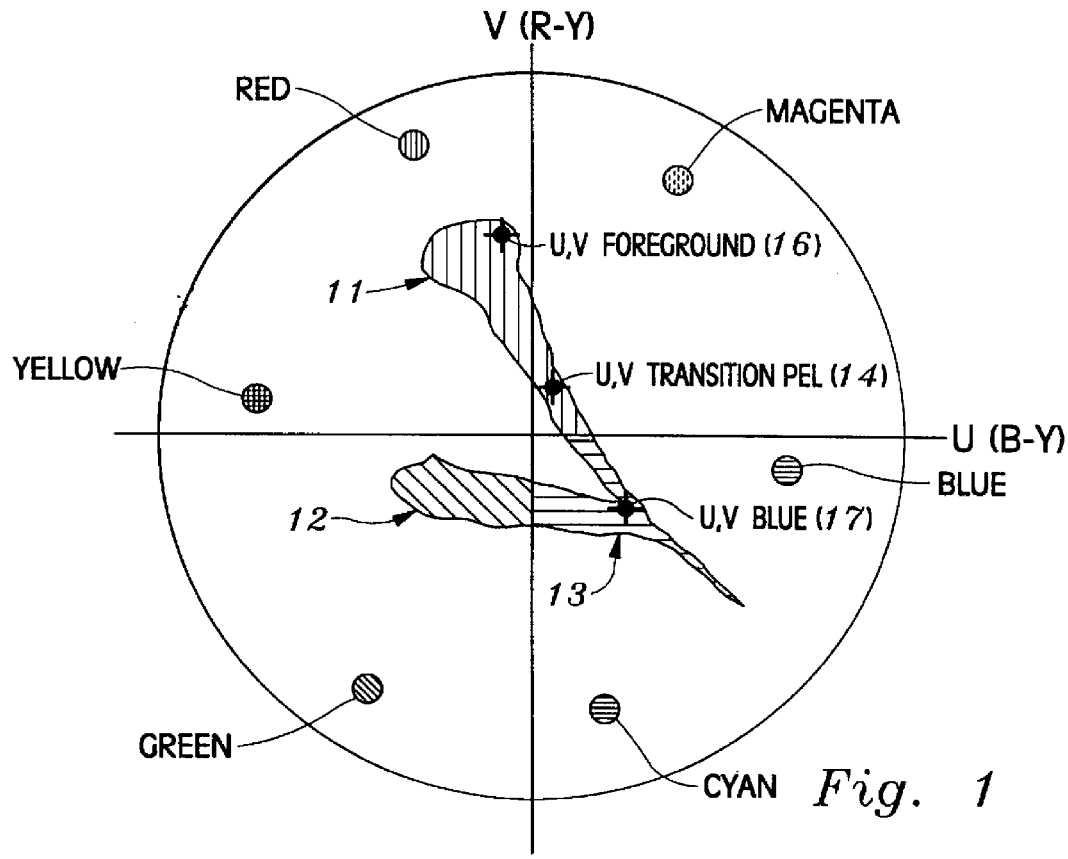
FIG. 1 is a color difference representation, in U,V vectorscope domain, of a foreground image including both red and green objects, and identifying certain U,V color difference values for pels, or pixels, in the foreground, the transition area, and the blue screen.

In FIG. 1, a vectorscope representation of a foreground image, including a red object 11 and a green object 12 in front of a blue background 13, is shown. Such an image will include full foreground object, transition, and full blue, or other selected background color values. The color difference value (U,V) of a transition pel located, for example, between the red object and the blue screen is identified by numeral 14. After determining that a particular pel is, in fact, a transition pel, the invention selects a full foreground color value (U,V Foreground) 16 and a full blue background color value (U,V Blue) 17, appropriate for that pel.

Color difference values 16 and 17 represent graphical end points used to calculate the key signal. By dividing the vectorscope domain distance between U,V Transition 14 and U,V Foreground 16 by the distance between U,V Foreground 16 and U,V Blue 17, a key signal is determined. This key signal is a function of the location of the transition pel relative to the selected transition endpoints within the U,V plane.

The key signal is then used to determine the color characteristics of the composite output, transition pel. This is accomplished by subtracting the selected full blue (Y,U,V) value from the insert video (Y,U,V) value, and adding the resultant insert video, proportioned by the key signal, to the current foreground video. Thus, a foreground transition pel whose UV value lies one-fourth of the way from full foreground to full blue would have 25% of the full blue value subtracted from it and a corresponding 25% of full insert video added back into it to form the composite transition pel.

Figure 2:
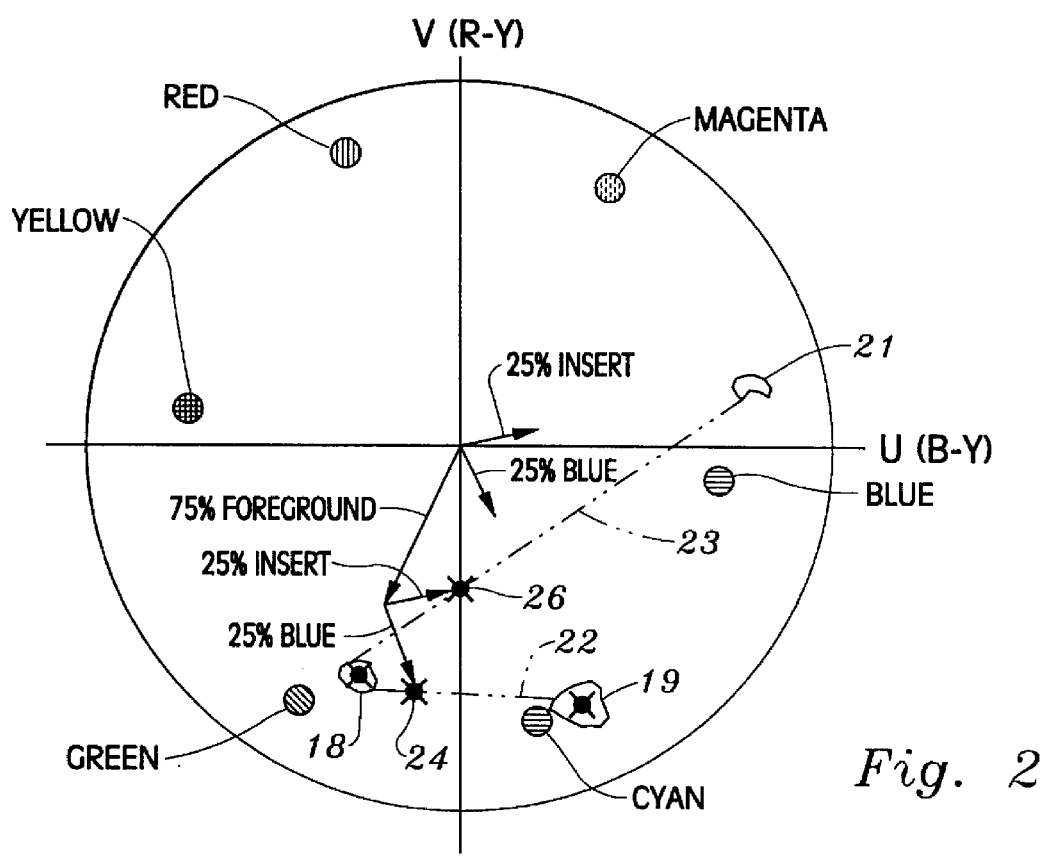
FIG. 2 is a vectorscope representation showing the color arithmetic of a chroma key process, with a green foreground video image transitioning to a blue screen, the latter to be replaced with magenta/blue insert video image.

A mathematical representation of the process of forming the composite pel is shown in FIG. 2. It will be noted that a green foreground image 18 is transitioning to a blue background screen 19. The blue screen is to be replaced in the transition process, by proportionate amounts of magenta/ blue colored, insert video image 21. The foreground image transition path 22, includes the color difference values represented by the transition from green foreground to blue background. The desired composite transition path 23, includes the color difference values represented by the transition from green foreground to magenta/blue insert.

The color difference value of the foreground transition pel lies on transition path 22, and is identified by numeral 24. It is evident that value 24 is 25% of the distance from foreground 18 to background 19. Value 24 can be viewed as the sum of 75% foreground color difference value and 25% of full blue color value. The desired composite transition value 26 is the result of adding 75% foreground color value and 25% insert color value. The 75% foreground color value can be recovered from the transition value 24, by vector subtracting 25% blue from it. Then, vector adding the 25% insert color value places the composite transition value 26 in the proper location on the desired composite transition path 23.

The present invention uses one of three methods to detect if a U,V value within a foreground image is a transition pel. If so, the method further selects appropriate full foreground and full blue transition endpoint color difference values for the transition pel. Then, an appropriate key signal is generated, based upon the U,V domain location of the transition pel between the endpoint color values. A video compositor subtracts the full blue endpoint value from the insert video. The key signal properly proportions the resultant insert video signal. The video compositor adds the proportioned insert video to the current foreground video, outputting a transition video pel of correct color value.

The discussion immediately below will address each of these three methods separately. Then, a further explanation will be given, regarding integrated use and operation of the three methods.

Method 1

In implementing the first method, the user preliminarily generates a list of full insert, blue color values. These values correspond to the blue portions of the foreground video image which will be replaced entirely with full insert video image, when the composite video image is formed. The preferred means of selecting the full insert values is to click on the desired blue areas in the displayed foreground image, using a mouse cursor overlaid on top of the foreground video. All the color difference values in the U,V plane within a predetermined radius of the selected blue pels are then added to the full insert "look up" list or table. In the present example, the list includes all the blue screen U,V values within the indicated full insert blue background 13, shown in FIG. 1.

It should also be noted that when using the first method, the Y, or luminance values of the selected pels may also be added to a separate Y full insert limit list, or table. In such instances, a full insert pel is defined as one whose luminance value is in the full insert Y list, and whose color difference value is also found in the U,V full insert list.

Having developed a full insert list, the remaining steps of the first method can be implemented. The spatial area around each "current" pel in the foreground image is examined to determine if any pel within a predetermined immediate neighborhood thereof, is listed on the full insert list. If it is, then the current pel under consideration is identified, or flagged, as a transition pel (Y,U,V Transition).

Figure 3:
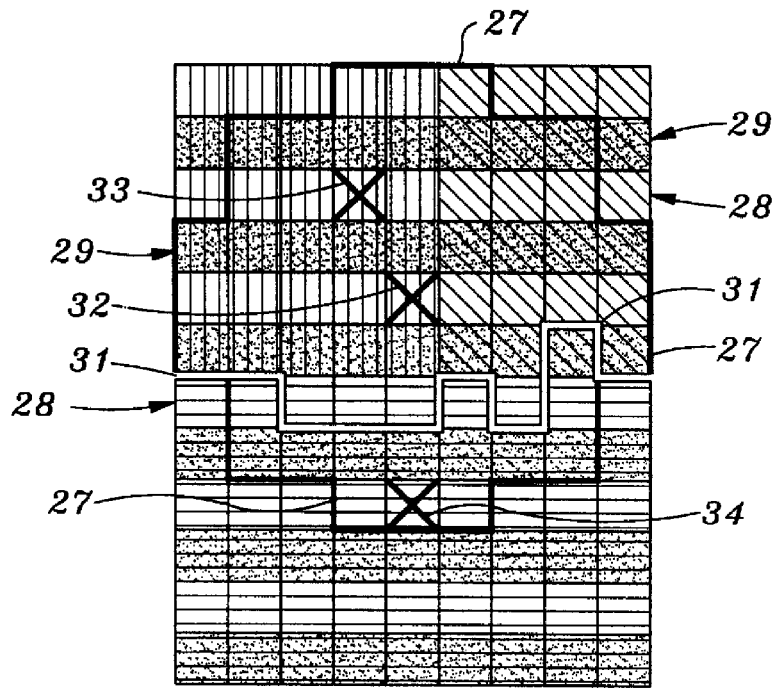
FIG. 3 is a graphical representation of pels within a transition portion of a foreground video image, including both foreground and blue color pels, and generally depicting the neighborhood color value determination approach of the first method.

Making particular reference to FIG. 3, a neighborhood boundary 27 defines the generally circular area within which such pel examination takes place. It will be noted that 29 pels are located within the defined neighborhood, although this number is arbitrary, and may be changed to satisfy particular requirements. Current field lines, along which the current pixels or pels are located, are generally designated 28, and interlace field lines are generally designated 29. A full insert boundary 31 defines the uppermost limit of full insert pels; in other words, all pels located below the boundary 31 have color difference values on the full insert list, discussed above.

For purposes of this general discussion, only three pels will be identified in FIG. 3. These pels include: transition pel 32 (U,V, Transition), full local foreground pel 33 (U,V, Foreground), and full local blue pel 34 (U,V, Blue). Since at least one pel within the neighborhood (blue pel 34) is below boundary 31, and therefore on the full insert list, pel 32 is flagged as a transition pel. That is to say, it is a pel which is spatially located in the region of the foreground image in which the foreground object is transitioning in color value to the full blue screen.

Through a process to be discussed more fully below, the first method selects full blue pel 34 from neighboring full insert pels as one of the endpoint pels used to calculate the key signal. Having selected pel 34, the first method then selects full foreground pel 33 from neighboring pels in a U,V plane direction opposite that from pel 34. Accordingly, full foreground pel 33 represents the other endpoint pel in the desired color transition path. Foreground pel 33 and full blue pel 34 have color difference values which now may be used to calculate the key signal.

Then, the first method uses this key signal to subtract out a proportionate amount of blue from the foreground image, and add a proportionate amount of insert video to replace the blue. This process produces a correct linear transition from the foreground image to the insert image. FIG. 4(c) is a graph showing the above-described linear transformation, produced by the present invention. The color magnitude of full foreground green color 36 is graphed against the color magnitude of full insert yellow color 37, in a 0% to 100% transition. It will be appreciated that throughout the linear transition, appropriate amounts of each color are present in the transitioning image.

Figure 4A:
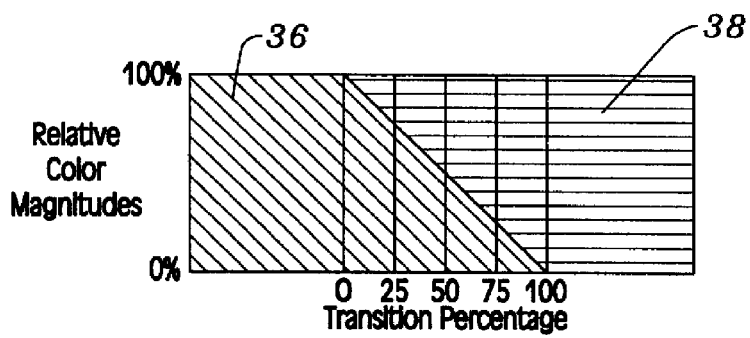
FIGS. 4(a)–4(c) are graphical representations showing relative color magnitudes in a foreground image, a prior art composite image, and a composite image resulting from application of the present invention.
Figure 4B:
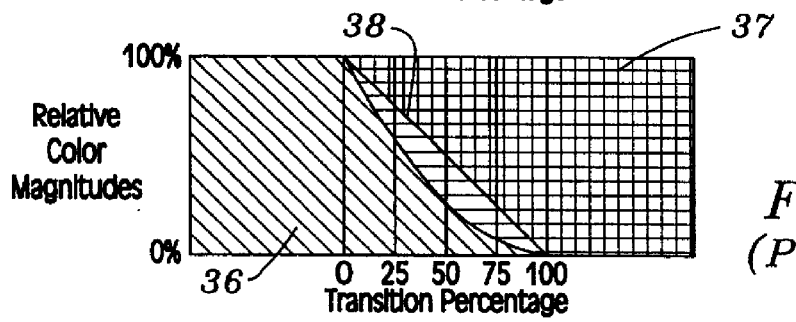
Figure 4C:
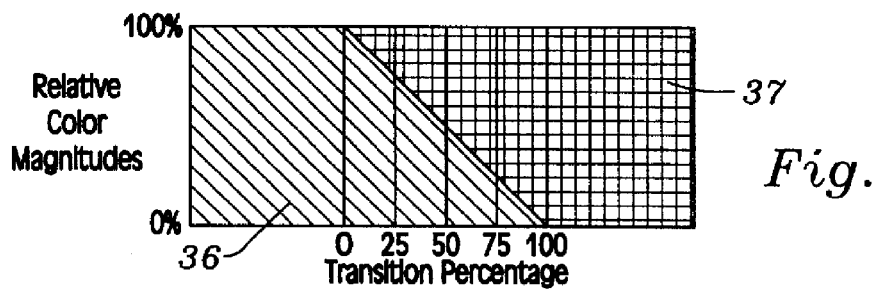

FIG. 4(a) shows color magnitudes within the original foreground image, in which the full foreground green color 36 transitions in linear fashion to a full background blue color 38. Prior art chroma key systems mix the insert image with the foreground image, but they are unable to maintain linearity during the transition. A typical prior art chroma key transition is depicted in FIG. 4(b). Even under the best possible clip and gain settings for the chroma key controls, the composite output signal will consist of 25% foreground, 25% blue, and 50% insert at the 50% transition point.

Figure 5:
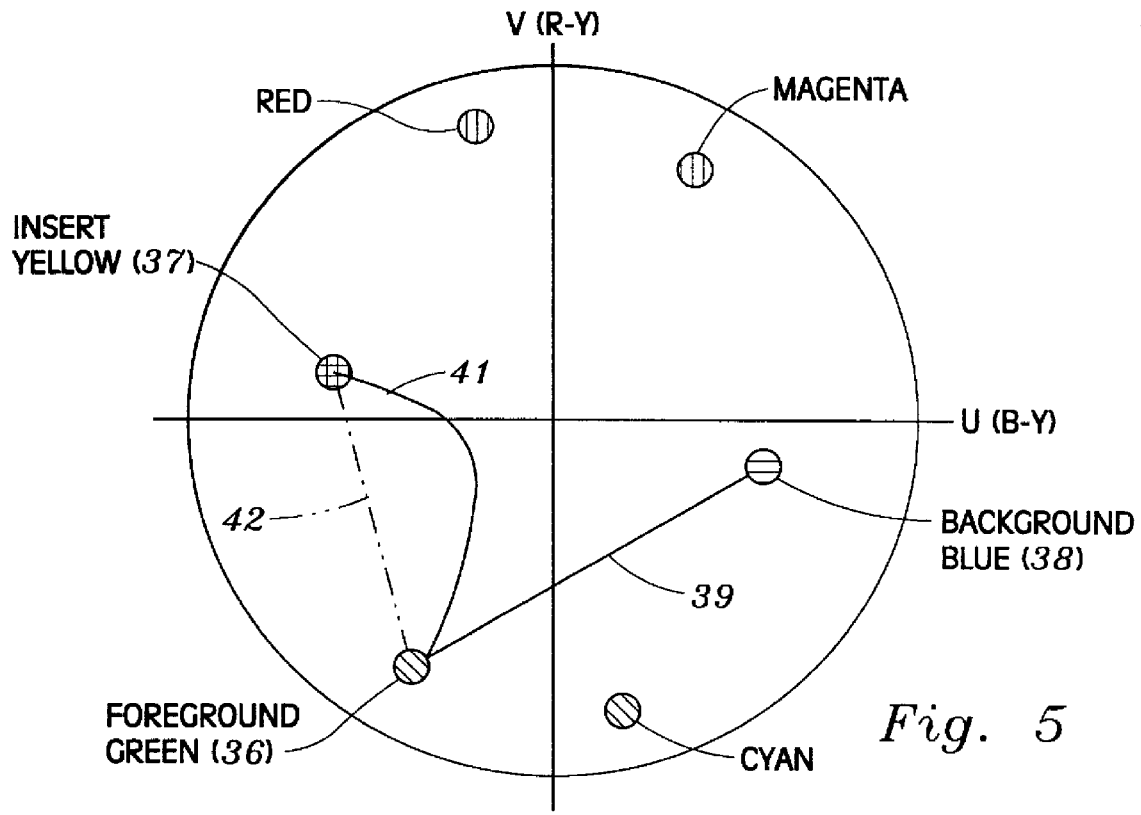
FIG. 5 is a vectorscope representation showing color difference value transitions both within the foreground image itself, and within the foreground/insert composite image, using both the method of the prior art and the method of the present invention.

FIG. 5 vectorscope plot depicts a U,V plane explanation of the same phenomena. The original foreground scene transition line 39, shows the linear color difference transition between the foreground green 36 and the background blue 38. A prior art composite image transition path 41 extends from foreground green 36 to insert yellow 37. However, path 41 is skewed in favor of blue color difference values, and displays a curved, non-linear transformation characteristic. The composite image transition path 42 of the present invention also traverses color difference values between foreground green 36 and insert yellow 37, but does so in linear fashion.

We now turn to FIG. 7, and explain specifically how the first method is implemented. FIG. 7 includes both FIGS.

7(a) and 7(b), which are arranged to be placed side by side, and considered as a single diagram. Most of the block diagrams include associated detail explanations of components, input signals, or output signals, all surrounded by broken line.

Certain of the operations and functions which are described herein are preferably carried out using a combination of computer hardware and software. Since various combinations of hardware and software may be used to implement the invention as described herein, no attempt is made to describe particular components or operations with greater specificity, where persons of ordinary skill in the art will be readily familiar with suitable components, operations, or their equivalents. Nor is the particular disclosure herein intended to be limiting, in any way, to using computer hardware in lieu or computer software, or vica versa, in particular instances, as any meaningful delineation between the two has become increasingly difficult.

A user designated list of full insert U,V values, discussed above, is stored in a Full Insert Detect RAM 43, within a Neighborhood Pel Generator 44. It should also be noted that more than one list may be generated, for example, to effect chroma key processing using different background color values. A Foreground Video Input Signal 46 is delivered to Generator 44, and each Y,U,V color value within neighborhood 27, is sequentially fed to Detect RAM 43. A spatial mask index number may also be fed concurrently to the input address of Detect RAM 43. This permits different key signal parameters to be output, depending upon which mask is currently active. In other words, the output of RAM 43 may be tailored to respond to full insert values only within a predetermined, area or color, of the foreground image.

For each of the pels within the area defined by neighborhood 27, the RAM outputs either a "1" or a "O", depending upon whether or not, the U,V value of the incoming pel is on the full insert list. The respective output signals are delivered to the Full Insert Flag Line Delays 47. After passing through four line delays therein, the output data are routed to Neighborhood Full Insert Flag Storage 48.

Figure 6:
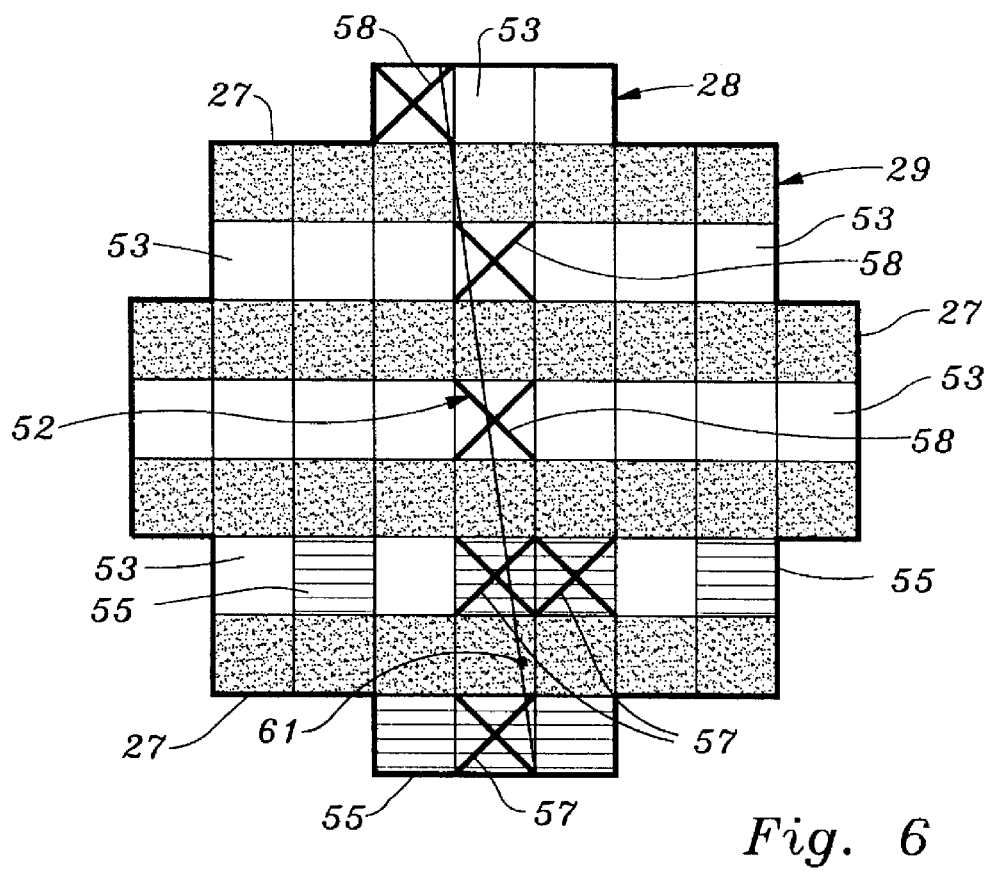
FIG. 6 is a graphical representation of neighborhood pels sampled during the preselection process of the first method.

The Foreground Video Input Signal 46 is also fed to Video Line Delays 49, including four line delays like the Full Insert Flag Line Delays 47. A two line delayed "current" pel color value, and the 28 color values surrounding it are entered into registers within Neighborhood Pel Storage 51. FIG. 6 shows the spatial arrangement of the current pel 52 and the surrounding 28 neighborhood pels 53, within the predetermined neighborhood boundary 27. For reasons which will be apparent from the discussion herein, complete Y,U,V values for current pel 52 and flagged pels 55 are entered into Storage 51. However, only the U,V values for the other neighborhood pels 53, not flagged, are entered into Storage 51.

Neighborhood Pel Storage 51 outputs both the pattern and the color values for the twenty nine pels, including the current pel 52 and all the neighborhood pels 53. The Neighborhood Full Insert Flag Storage 48 outputs both the pattern and full insert flags, if any, for the current pel 52 and all the neighborhood pels 53. These two outputs are delivered to a Transition Endpoint Preselector 54. The purpose of Preselector 54, is to provide three preliminary candidates for an appropriate foreground endpoint pel, and three preliminary candidates for an appropriate blue endpoint pel.

Providing at least one of the neighborhood pels 53 has been flagged as a full insert pel 55 in the Neighborhood Pel Generator, then the current pel 52 is designated as a transition pel (Y,U,V Transition) in Transition Endpoint Preselector 54. Each of these full insert pels 55 is indicated by horizontal line shading in FIG. 6. The spatial relationship, or pattern, of neighboring full insert flag pels is fed to address inputs of the Preselection ROMS 56. The output from ROMS 56 will be the indices of three candidates for the full foreground (U,V foreground) endpoint value, and three candidates for the full blue (U,V blue) endpoint value.

ROMS 56 store all of the possible pattern arrangements for flagged pels 55 within neighborhood 27. ROMS 56 also include predetermined data, which outputs the weighted, central location of the flagged pels 55 and selects the three pels which are closest to that location. Finally, ROMS 56 select foreground pels most remotely located from that central location. Accordingly, the full blue indices output from the Preselection ROMS 56 correspond to the three pels 57 which are closest to the centroid 61 of the spatial pattern formed by the totality of the input full insert flag pels 55. Also, the full foreground indices are chosen as the current pel 52 and two non-full pels which are radially opposite the full insert centroid 61. These foreground pels are commonly identified by the numeral 58 in FIG. 6.

These indices, in turn, are delivered to the U,V Generator Preselectors 57 to switch the appropriate six video neighbor values onto the output busses. Accordingly, color difference values for three Preliminary Foreground Pel Candidates and three Preliminary Blue Pel Candidates are outputted from Preselectors 59, and fed to Transition Endpoint Final Selector 62.

In the event that the current pel 52 is also flagged as a full insert pel, Transition Endpoint Preselector 54 bypasses the candidate selection process described above, and issues a command for full insert video to replace the current pel 52. In the event that none of the pels within the neighborhood is flagged as a full insert pel, Preselector 54 also bypasses the candidate selection process. A command is then issued for the current pel to pass unaffected to the composite video, as it is presumably a full foreground pel.

Returning now to FIG. 7(a), a user selected nominal blue (U,V nominal blue) is stored in Magnitude Generator RAMS 63, within Selector 62. Magnitude Generator RAMS 63 receive the U,V color values for the six pel candidates, and determine the U,V plane distance from the color value of the predetermined nominal blue. These six distance values are fed in two respective groups to inputs for Magnitude Comparators 64. The Magnitude Comparators 64 determine a single blue pel candidate which is the closest in the U,V plane from U,V nominal blue; Comparators 64 also determine a single foreground pel candidate which is the farthest in the U,V plane from U,V nominal blue.

The outputs from Comparators 64 switch the corresponding Preliminary Foreground Pel Candidate and Preliminary Blue Pel Candidate values onto the outputs of the U,V Foreground and Y,U,V Final Selectors 66. These selected pels, namely, U,V Foreground and U,V Blue, are the transition endpoints pels used in conjunction with the associated transition pel, in generating the key signal. The third output from Selectors 66 is the Y,U,V Current. In this instance, the Y,U,V transition pel value is the current value, and this value is accordingly switched onto the Y,U,V Current bus output.

Figure 7B:
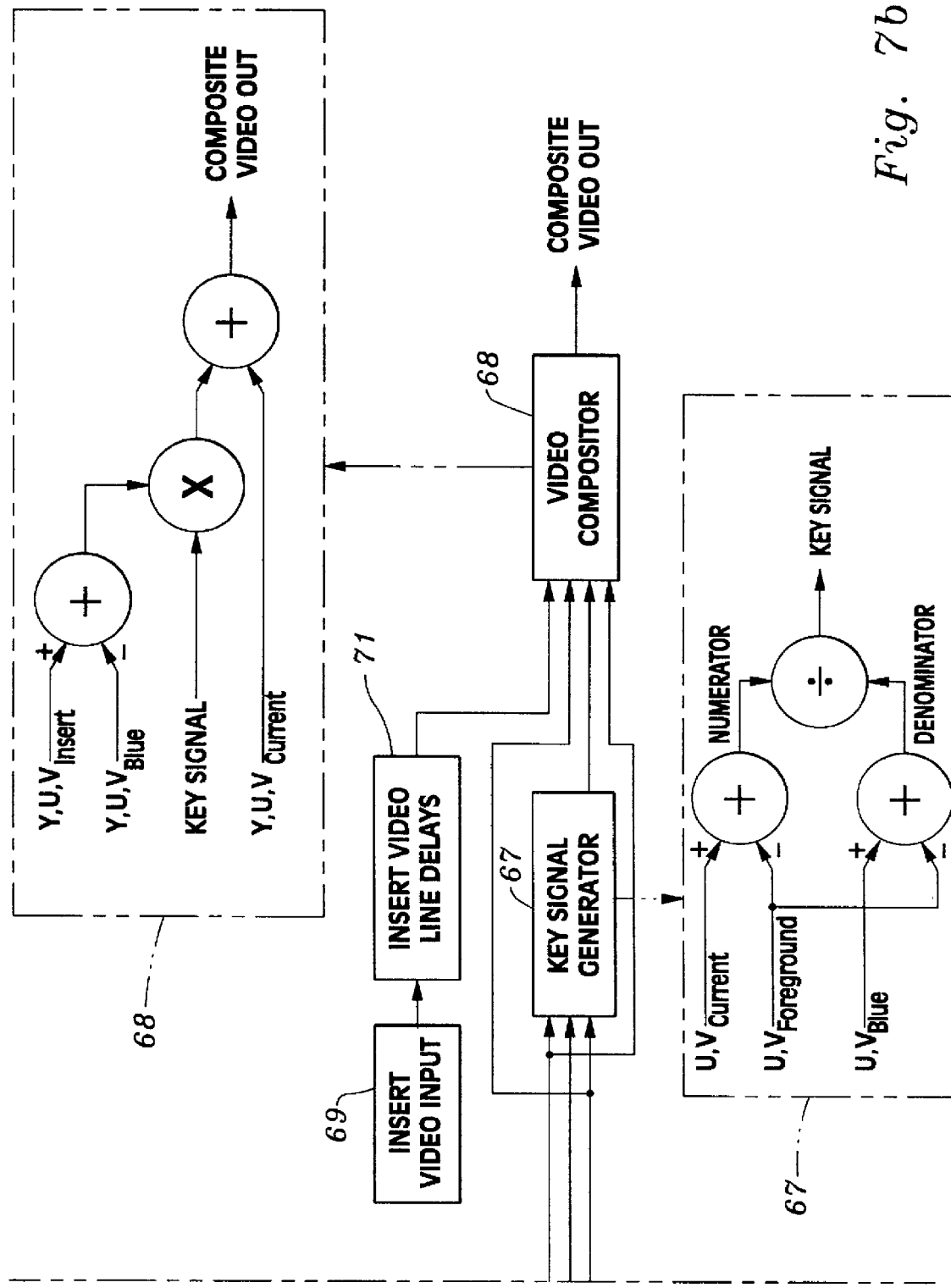

Referring now to FIG. 7(b), the three outputs of Selectors 66 are fed into a Key Signal Generator 67. It should be noted that only the U,V components of the three pels are used by Generator 67 in determining the Key Signal. The Key Signal is a percentage, or decimal value, which corresponds to the location of the current pel, on the transition path from the endpoint foreground pel to the blue endpoint pel. This value is determined mathematically by simply subtracting the U,V Foreground from the U,V Current, and dividing that distance by the distance between the endpoint pels.

In a first mode of operation, the distance between endpoint pels is determined by subtracting U,V Foreground from U,V Blue. This mode of operation is selected where no shadows are desired in the full insert portion of the composite image. In a second mode of operation, the distance between the endpoint pels is determined by subtracting U,V Foreground from U,V Nominal Blue. Selection of the second mode results in shadows being cast over a portion of the full insert image. These shadows would correspond, for example, to the shadow which a weather man casts over an adjacent weather map. The shadow produces a more realistic composite image in that application, and therefore may be selected by the operator of the apparatus herein.

The resultant Key Signal is routed to a Video Compositor 68. Also routed to Compositor 68, from an Insert Video Signal Input 68, is an insert video signal (Y,U,V Insert). This insert video signal is delayed by Insert Video Line Delays 71, an amount of time corresponding to temporal delays imposed upon the signals for Y,U,V Current and Y,U,V Blue, during upstream processing. Also concurrently routed to the input of Compositor 68 are Y,U,V Current and Y,U,V Blue. In the Compositor 68, the Y,U,V Blue value is subtracted from, and the Y,U,V Insert is added to, the Y,U,V Current, in proportion to the value of the Key Signal, for each pel in the composite image. In this manner, the composite video image displays a linear color transformation from the foreground video image to the insert video image.

Method 2

Figure 8:
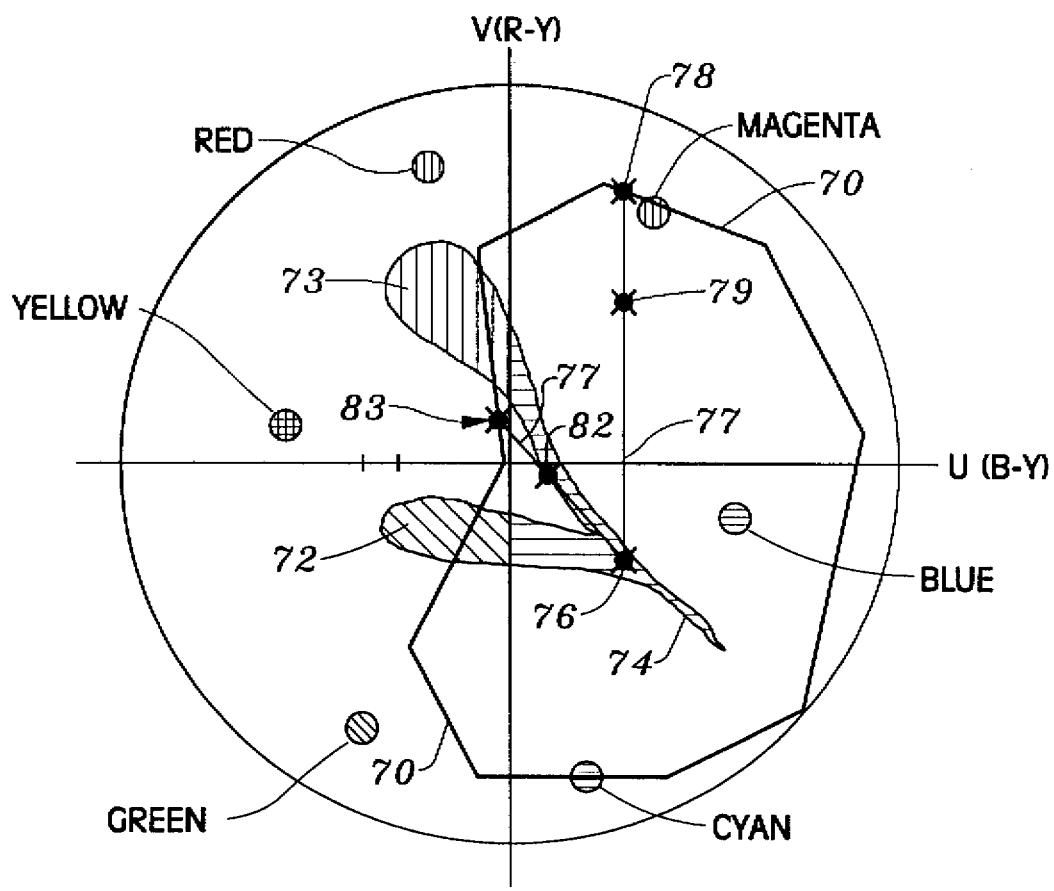
FIG. 8 is a vectorscope representation of a typical closed polygon drawn by the user in implementing the second method.
Figure 9:
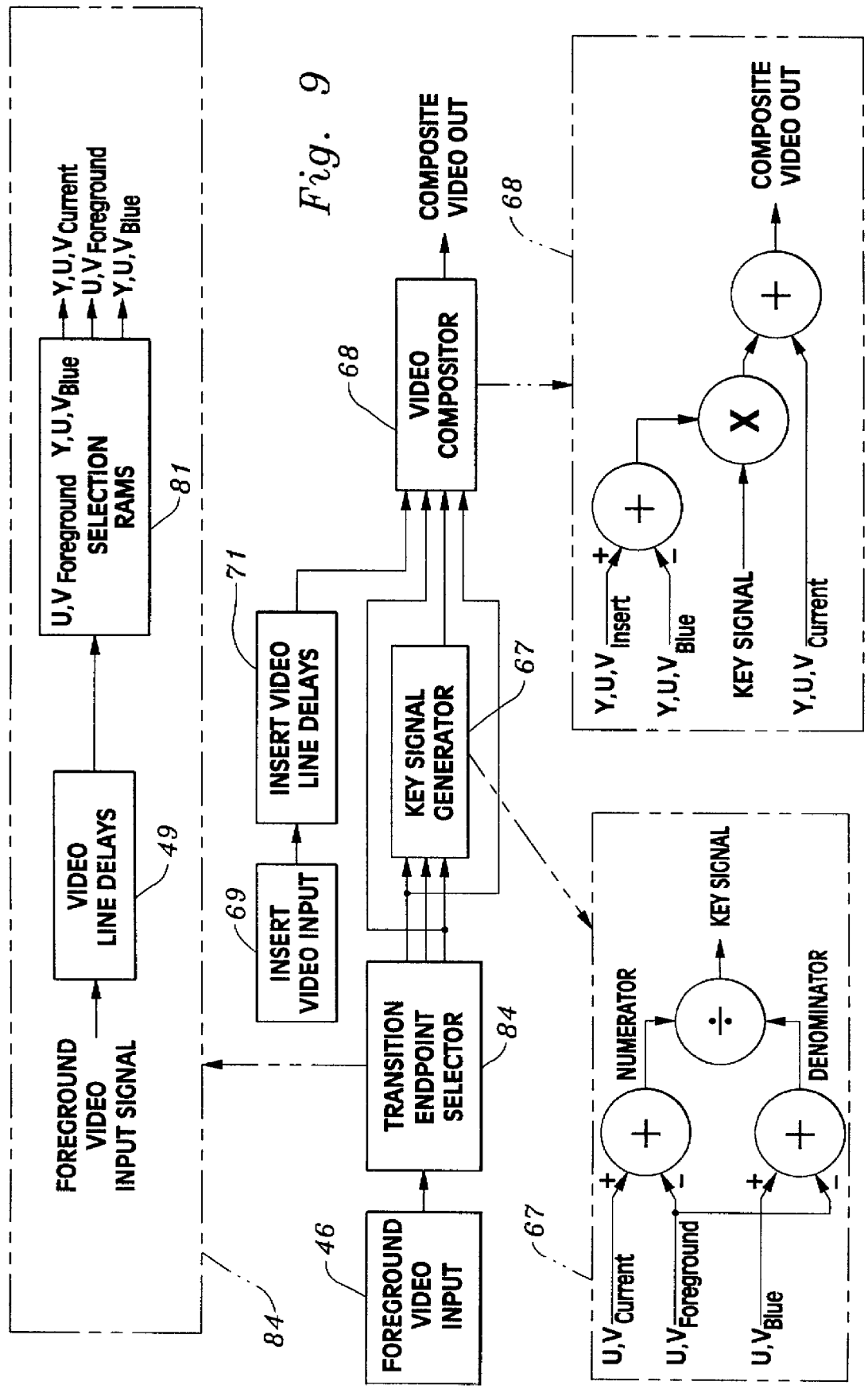
FIG. 9 is a functional block diagram for carrying out the second method.

As with the first method, the second method also requires that a particular incoming pel from the foreground image be identified as a transition pel, before a key signal is generated. To accomplish this task, the user first displays the foreground image in a U,V plane on a vectorscope. Then, drawing a continuous boundary line 70 over selected portions of the image, the user surrounds certain displayed color values. All pels having U,V color values within the area enclosed by the boundary line 70, are thereby defined as transition pels. FIG. 8 shows a vectorscope display of a foreground image including a green object 72 and a red object 73, both of which transition in color values to a full blue background 74.

A predetermined nominal blue value (Y,U,V Nominal Blue) 76 is also located within the polygon defined by the boundary 70. The nominal blue value 76 represents one of the endpoints in the chroma key color transition, to be effected by the key signal. As will be recalled from the discussion above, the first method requires that a current local blue color be selected from three candidates in the neighborhood of the current pel. Although the current local blue color is selected as having a color value which closest to a nominal blue, the value of the local blue may be different than nominal blue. The second method, on the other hand, defines the nominal blue color value 76, as a fixed, or predetermined, blue color endpoint for all key signal transitions.

After the user has drawn the boundary 70, certain data about the encompassed region is generated by appropriate software and stored in RAM in a computer (not shown). Specifically, a software program creates a plurality of imaginary radial lines 77, extending from nominal blue 76 (Y,U,V Blue), until each intersects boundary 70. The intersection of radial 77 with boundary 70 represents a corresponding full foreground value 78 (U,V Foreground). For every transition pel 79 (U,V Transition) along each radial 77, U,V Foreground and Y,U,V Blue values are stored in U,V Foreground and Y,U,V Blue Selection RAMS 79. These stored U,V Foreground and U,V Blue values represent the appropriate transition end points for each transition pel within the area surrounded by boundary 70. Although the Y, or luminance value for Blue is not used in determining the end points, it is used later in generating the composite video, and is therefore stored along with the U,V values.

For example, in FIG. 8, a radial 77 extends from nominal blue 76 though a current transition pel 82 (Y,U,V Current) to a full foreground pel 83 (U,V Foreground). For current transition pel 82, the U,V values for nominal blue 76 and full foreground 83, determine the transition endpoints used to generate the key signal for pel 82.

FIG. 8 shows more specifically how these endpoint U,V values are accessed, processed, and applied to determine each transition pel within the composite video image. A Foreground Video Input 46 delivers a foreground video input signal to Transition Endpoint Selector 84. The signal passes first through two lines of video delay within Video Line Delays 49, to match the delay given to Y,U,V Current in carrying out the first method. The delayed signal in then routed to U,V Foreground And Y,U,V Blue Selection RAMS 81. As each pel, containing a respective U,V Current value, is delivered to the address inputs of the RAMS 81, the corresponding U,V Foreground and Y,U,V Blue values, previously determined and stored, are output.

Next, the accessed U,V Foreground and the Y,U,V Blue, along with the associated Y,U,V Current values, are all inputted, to Key Signal Generator 67. As described above in connection with the first method, Key Signal Generator creates a numerator and a denominator, based upon distances in vectorscope domain, between the current pel and the full foreground and between the nominal blue and the full foreground. The resultant key signal is then fed to Video Compositor 68. In precisely the same manner as set forth above for the first method, the Video Compositor subtracts an appropriate amount of blue from the insert signal and multiplies that result by the key signal. Then, this proportioned signal is added to the current video to produce the composite video.

Then, using the U,V values of the full foreground, the predetermined nominal blue, and the transition pel, the key signal may be determined, and applied to produce the composite video, as described above.

Method 3

Generally, the third method is most useful when used in conjunction with an area limiting mask, so that the method will only be applied to pels within that designated area. The mask is necessary because it is likely that the same Y,U,V values which are designated as transition pel values, exist in other locations in the image where they should not be treated as transition pels.

The third method contemplates that initially, a full foreground value (U,V Foreground) is selected, along with a corresponding set of adjacent and surrounding transition values (Y,U,V Transition). These values may be selected directly from viewing the foreground image, and through the use of a mouse or the like, graphically drawing a boundary line, or box, which delineates a specific problem area for pel transitions. These areas may include objects such as strands of hair or fur which transition from blue into the true hair color and then back again to blue, in a very short distance.

As with the second method, this method uses nominal blue (Y,U,V Nominal Blue) as the full blue value for one of the transition endpoint values. The other transition endpoint value, full foreground (U,V Foreground), is designated as the pel within the previously defined area or boundary, which is farthest from nominal blue in U,V space. All Y,U,V values within an arbitrary but predetermined radius in U,V space of the values within the area or boundary, are then designated as values for transition pels.

Figure 10:
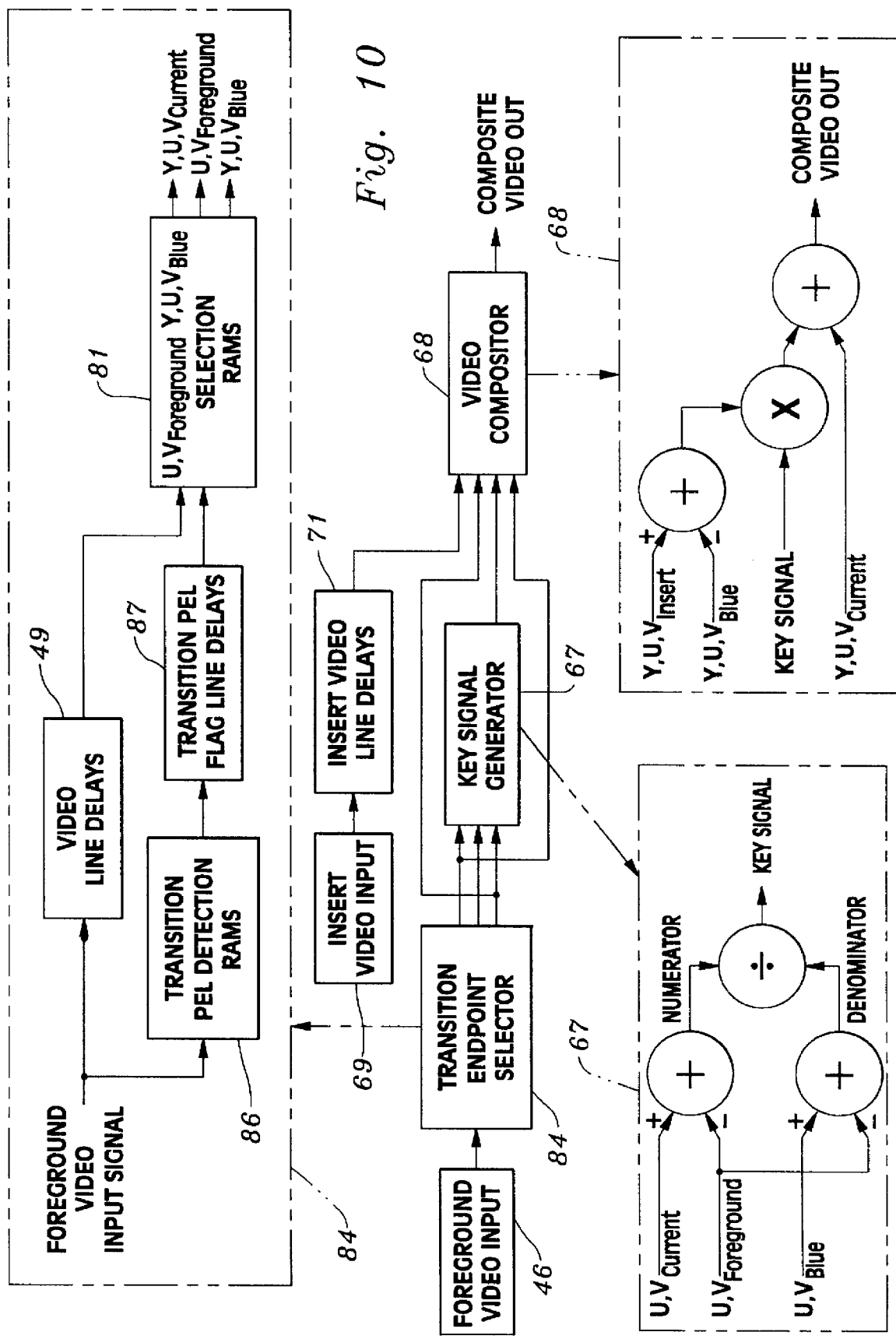
FIG. 10 is a functional block diagram for carrying out the third method.

After these initial steps are completed, the designated transition pel Y,U,V values are stored within Transition Pel Detection RAMS 86 (see, FIG. 10). Detection RAMS 86 are simply a second bit of the Full Insert Detect RAMS 43, described in connection with the first method. A Foreground Video Input Signal is delivered to the Transition Pel Detection RAMS 86, in exactly the same manner as for the Full Insert Detect RAMS 43. However, the output bit of Detection RAMS 86 is a Transition Pel Flag, rather than a Full Insert Flag. Thus, each incoming pel which has a Y,U,V value within the table stored by RAMS 86, results in the output of a Transition Pel Flag.

Each Transition Pel Flag is delayed by Transition Pel Flag Line Delays 87, containing two lines of video delay. This delay corresponds to the video delay impressed upon the Y,U,V Current signal, used in the first method. The delayed Pel Flags are then delivered to U,V Foreground And Y,U,V Selection RAMS 81. The Video Line Delays 49, are the first two lines of video delay used in the first method, and their output is likewise routed to the input of Selection RAMS 81.

The previously selected U,V Foreground value, along with the Y,U,V Blue value, have been stored in the Selection RAMS 81. If the current pel (Y,U,V Current) has been flagged as a transition pel, the associated Pel Flag enables RAMS 81, and a U,V Foreground value is outputted. In the event that spatial mask(s) are in use, one or more different U,V Foreground values may be stored in RAMS 81. If this be the case, Selection RAMS 81 would receive a spatial mask index number, for the current pel. This permits different U,V Foreground values, or no U,V value to be outputted, depending upon which mask is currently active.

The Y,U,V Current, U,V Foreground, and Y,U,V Blue values are then fed to the Key Signal Generator 67. The Key Signal is generated using a method identical to that already set forth above, in connection with the first and second methods. Further use of the generated Key Signal, within the Video Compositor is also identical to that previously described.

Figure 11B:
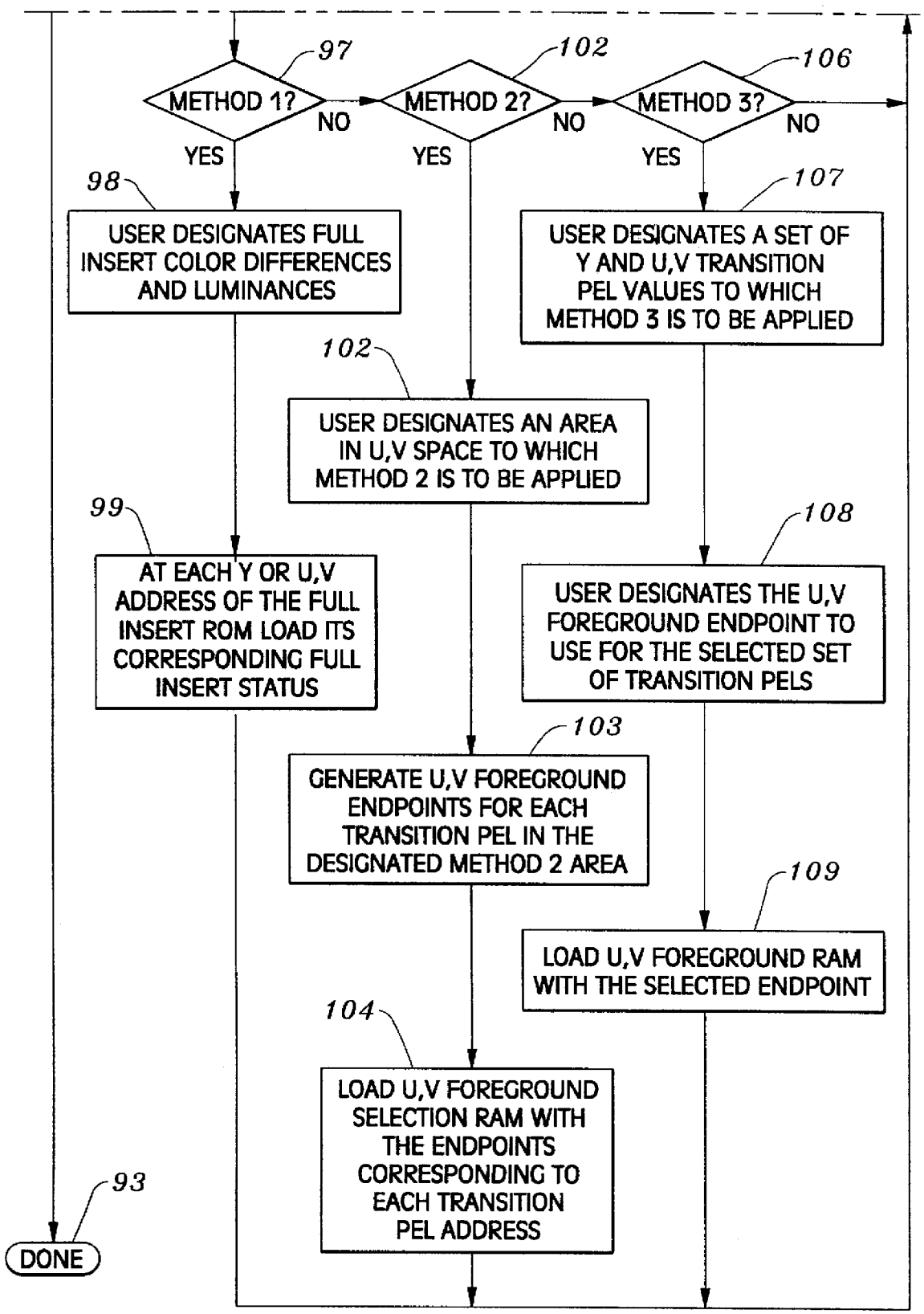

The three methods of the present invention may be used individually, or exploited as an integrated system for chroma key signal generation and composite video imaging. So that the initialization and integrated use of these methods can better be understood, a Software Flowchart has been included in FIGS. 11(a) and 11(b). At the Start (step 87) of the sequence, the user designates (step 88) a nominal blue (Y,U,V Nominal Blue) color value, which is then loaded (step 89) into Y,U,V Blue Selection RAMS 81. Next, the software loads (step 91) the Magnitude Generator RAMS 63 with the distances in the U,V plane from Nominal Blue to each possible U,V address. In this way, RAMS 63 are used as a U,V distance "look up" table, so that in subsequent calculations where distances for U,V values are required, they will be readily available. The precise configuration of the RAM storage device is not critical. By way of example only, the present invention uses eight bits for each axis of the U,V plane, for a total number of possible color values totals approximately 64,000.

A decision (step 92) is made whether the parameters of any of the three keying methods need initializing or changing. If not, the process proceeds immediately to done (step 93). However, if initialization or changing is required, the process continues to a decision (step 94), whether the new parameters are to apply globally, to all areas of the foreground image. If the decision is in the affirmative, then no mask is designated, and the entire foreground image is affected by the parameters. The user, however, has the alternative of limiting the applicability (step 96) of the parameters with a mask. Typically, this is accomplished by the user drawing a line around a region on the screen, defining a limited area where the keying parameters are to be used.

The software then proceeds to another decision (step 97), where the user determines whether or not method one is to be initialized or changed. If so, the user first designates (step 98) the full insert color (U,V) differences, and if desired, corresponding luminance values, for the full insert pels. Then, at each Y or U,V address of the Full Insert Detect RAM 43, load (step 99) the corresponding full insert status for each designated pel. This completes the initialization or modification of parameters for the first method.

The process then returns to decision step 97, whereupon the first method is declined, and the software proceeds to another decision (step 101). If method 2 is selected, the user designates (step 102) a closed area in U,V space where the second method is to be implemented. Then, the software generates (step 103) U,V Foreground endpoints for each transition pel located within the area designated in step 102. Finally, the software loads (step 104) the U,V Foreground Selection RAM 81 with the U,V endpoints corresponding to each transition pel address. The process for initializing or modifying parameters of the second method are now complete, and the software returns to decision step 97.

Passing now through decision step 102, the process continues to a final decision (step 106). If method three is selected for initialization or modification of parameters, the user designates (step 107) a set of Y and U,V transition pel values to which the third method is to apply. Next, the user designates (step 108) the U,V Foreground endpoint value, to use for the selected set of transition pels. Lastly, the software loads (step 109) the U,V Foreground Selection RAM 81, with the selected endpoint. With the third method now complete, the process is complete, until reinitialization or modification of parameters is required.

In actual practice, the user has the option of manually selecting which of the three methods to use in determining the Key Signal. If this is the case, the computer implements the software parameters previously determined by the user, and accordingly generates key signal for use in creating the composite video image.

Alternatively, the user may enable all three methods, have the computer and the software select most appropriate pair of U,V Foreground and corresponding U,V Blue endpoint values for each transition pel, resulting from the sequential application of each method. The appropriate U,V Foreground and U,V Blue pair is the one which has a U,V Foreground value farthest from U,V Nominal Blue. As a necessary step in carrying out the first method, the distance from U,V Foreground to U,V Nominal Blue is calculated and stored, so that value is readily available. Although this distance is not required to carry out the second and third methods, the respective distances can be generated from the established parameters and stored for the comparison.

The selected U,V Foreground and U,V Blue endpoint values are used to generate the Key Signal, in the manner described more fully above. Finally, the Key Signal is employed in the video compositor to output the desired composite video.

It will be appreciated, then, that I have disclosed an improved apparatus and method for generating a chroma key signal exhibiting linear color transition characteristics, in compositing a foreground video image with an insert video image.

What is claimed is:

1. A method for producing a composite video image from a foreground video image and an insert video image, the foreground video image including full foreground object pels, full background pets, and transition pels having a U,V or vectorscope domain color value between the full foreground object pels and the full background pels, comprising the steps of
   a. Storing the U,V color values of pels within a predetermined portion of the foreground video image, and identifying them as full insert pels;
   b. Sampling a spatial neighborhood surrounding a current pel within the foreground video image, and storing the U,V values of all pels within that neighborhood;
   c. Comparing the color values of all pels in the neighborhood with the stored color values of the full insert pels;
   d. Identifying the current pel as a current transition pel, if the color value of any of the neighborhood pels corresponds to the color value of any said full insert pel;
   e. Determining and storing U,V color values for an endpoint foreground object pel, and an endpoint background pel, for said current transition pel; and,
   f. Generating a key signal related to the percent distance said current transition pel is located along a path between said two endpoints in the U,V plane.

2. A method as in claim 1, further including the step of outputting a composite transition pel from a current Y,U,V value for the transition pel, by: subtracting a Y,U,V value for said endpoint background pel from a Y,U,V value for the insert video and producing a resultant Y,U,V value; multiplying said resultant Y,U,V value by said key signal; and, adding the product of said key signal and said resultant Y,U,V value to a Y,U,V value for the current pel.

3. A method as in claim 1 in which said spatial neighborhood is defined by a generally circular area around the current pel, including a plurality of current field lines and a plurality of interlace field lines.

4. A method as in claim 1 further including the step of selecting a Nominal Background value, and storing the value as U,V Nominal Background.

5. A method as in claim 4 further including the steps of selecting as said endpoint foreground object pel, a first pel farthest in the U,V plane from U,V Nominal Background, and further selecting as said endpoint background pel, a second pel nearest in the U,V plane from U,V Nominal Background.

6. A method for producing a composite video image from a foreground video image and an insert video image, the foreground video image including full foreground object pels, full background pels, and transition pels having a U,V or vectorscope domain color value between the full foreground object pels and the full background pels, comprising the steps of:
   a. Storing the U,V color values of pels within a predetermined portion of the foreground video image, and identifying them as transition pels;
   b. Comparing the color value of a current pel in the foreground video image, with the stored color values of the transition pels;
   c. Identifying the current pel as a current transition pel, if the color value of the current pel corresponds to the color value of any transition pel, and the current pel is within said predetermined portion;
   d. Determining and storing color values existing in U,V vectorscope domain for an endpoint foreground object pel, and an endpoint background pel, for said current transition pel; and,
   e. Generating a key signal related to the percent distance said current transition pel is located along a path between said two endpoints in the U,V plane.

7. A method as in claim 6, further including the step of outputting a composite transition pel from a current Y,U,V value for the transition pel, by subtracting a Y,U,V value for said endpoint background pel from a Y,U,V value for the insert video and producing a resultant Y,U,V value, multiplying said resultant Y,U,V value by said key signal, and adding the product of said key signal and said resultant Y,U,V value to a Y,U,V value for the current pel.

8. A method for producing a composite video image from a foreground video image and an insert video image, the foreground video image having foreground object pels, transition pels, and full insert background pels, comprising the steps of:
   a. Storing a vectorscope domain value, as U,V Nominal Background;
   b. Storing a list of U,V values, for selected full insert background pels within the foreground video image;
   c. Sampling the U,V color values of each pel within a predetermined neighborhood of pels around a current pel, identified as Y,U,V Current;
   d. Determining whether any sampled pels are on the full insert list, and if so, flagging those pels as full insert pels;
   e. Saving the full insert flags for the flagged sampled flags, and the color values for all sampled pels;
   f. Using a spatial pattern formed by the neighborhood full insert flags, selecting three pels closest to a center of gravity of the full insert flag pattern and identifying those three pels as candidates for a Y,U,V Background pel;
   g. Selecting two pels opposite a center of gravity of the full insert flag pattern, and identifying those two pels and Y,U,V Current as candidates for a U,V Foreground pel;
   h. Choosing from the candidates for Y,U,V Background, the pel nearest in U,V space to U,V Nominal Background and designating that chosen pel as Y,U,V Background;
   i. Choosing from the candidates for U,V Foreground, the pel farthest in U,V space from Y,U,V Nominal Background and designating that chosen pel as U,V Foreground;
   j. Generating a Key Signal by dividing the distance in U,V space from Y,U,V Current and U,V Foreground by the distance in U,V space between Y,U,V Background and U,V Foreground; and,
   k. Forming a composite video signal, by proportioning the amount of Y,U,V Background to be subtracted from Y,U,V Current by using the Key Signal, and proportioning an amount of a Y,U,V Insert to be added to Y,U,V Current by using the Key Signal.

9. A method for producing a composite video image from a foreground video image and an insert video image, the foreground video image having foreground object pels, transition pels, and full insert background pels, comprising the steps of:

a. Storing a Y,U,V Background endpoint value;
b. Storing a list of U,V Transition values, and a corresponding list including at least one U,V Foreground value and the Y,U,V Background endpoint value, for each pel within a predetermined portion of the foreground video image;
c. Designating a current video pel as Y,U,V Current, using the U,V value of Y,U,V Current in searching the list of U,V Transition values for a match;
d. Recalling the corresponding U,V Foreground value and Y,U,V Background endpoint value for a matched, corresponding U,V Transition value;
e. Generating a Key Signal by dividing the distance in U,V space from Y,U,V Current and U,V Foreground by the distance in U,V space between Y,U,V Background and U,V Foreground; and
k. Forming a composite video signal, by proportioning the amount of Y,U,V Background to be subtracted from Y,U,V Current by using the Key Signal, and proportioning an amount of a Y,U,V Insert to be added to Y,U,V Current by using the Key Signal.

10. A method as in claim 9 in which said step of storing a list of U,V Transition values is carried out by a user drawing a closed polygon boundary in U,V space, designating all pels within that polygon as transition pels, and in which U,V Foreground for a particular transition pel represents an intersection of a line drawn from the U,V value of Y,U,V Background through the transition pel to the polygon boundary.

11. A method as in claim 9 in which said step of storing a list of U,V Transition values is carried out by a user drawing an enclosed area directly on a video display of the foreground image, designating all pels within a predetermined radius of that area as transition pels, and in which a U,V Foreground is designated as the farthest pel in that area from the U,V value of Y,U,V Background.

12. An apparatus for producing a composite video image from a foreground video image and an insert video image, the foreground video image including full foreground object pels, full background pels, and transition pels having a U,V or vectorscope domain color value between the full foreground object pels and the full background pels, comprising:
   a. Means for storing the U,V color values of pels within a predetermined portion of the foreground video image, and identifying them as full insert pels;
   b. Means for sampling a spatial neighborhood surrounding a current pel within the foreground video image, and storing the U,V values of all pels within that neighborhood;
   c. Means for comparing the color values of all pels in the neighborhood with the stored color values of the full insert pels;
   d. Means for identifying the current pel as a current transition pel, if the color value of any of the neighborhood pels corresponds to the color value of any full insert pel;
   e. Means for determining and storing U,V color values for an endpoint foreground object pel, and an endpoint background pel, for said current transition pel; and,
   f. Means for generating a key signal related to the percent distance said current transition pel is located along a path between said two endpoints in the U,V plane.

13. An apparatus as in claim 12, further including means for outputting a composite transition pel from a current Y,U,V value for the transition pel, including: means for subtracting a Y,U,V value for said endpoint background pel from a Y,U,V value for the insert video and producing a resultant Y,U,V value; means for multiplying said resultant Y,U,V value by said key signal; and, means for adding the product of said key signal and said resultant Y,U,V value to a Y,U,V value for the current pel.

14. An apparatus for producing a composite video image from a foreground video image and an insert video image, the foreground video image including full foreground object pels, full background pels, and transition pels having a U,V or vectorscope domain color value between the full foreground object pels and the full background pels, comprising:
   a. Means for storing the U,V color values of pels within a predetermined portion of the foreground video image, and identifying them as transition pels;
   b. Means for comparing the color value of a current pel in the foreground video image, with the stored color values of the transition pels;
   c. Means for identifying the current pel as a current transition pel, if the color value of the current pel corresponds to the color value of any transition pel, and the current pel is within said predetermined portion;
   d. Means for determining and storing color values existing in U,V vectorscope domain for an endpoint foreground object pel, and an endpoint background pel, for said current transition pel; and,
   e. Means for generating a key signal related to the percent distance said current transition pel is located along a path between said two endpoints in the U,V plane.

15. An apparatus as in claim 14, further including means for outputting a composite transition pel from a current Y,U,V value for the transition pel, including: means for subtracting a Y,U,V value for said endpoint background pel from a Y,U,V value for the insert video and producing a resultant Y,U,V value; means for multiplying said resultant Y,U,V value by said key signal; and, means for adding the product of said key signal and said resultant Y,U,V value to a Y,U,V value for the current pel.

16. An apparatus for producing a composite video image from a foreground video image and an insert video image, the foreground video image having foreground object pels, transition pels, and full insert background pels, comprising:
   a. Means for storing a Y,U,V Background endpoint value;
   b. Means for storing a list of U,V Transition values, and a corresponding list including at least one U,V Foreground value and the Y,U,V Background endpoint value, for each pel within a predetermined portion of the foreground video image;
   c. Means for designating a current video pel as Y,U,V Current, using the U,V value of Y,U,V Current in searching the list of U,V Transition values for a match;
   d. Means for recalling the corresponding U,V Foreground value and Y,U,V Background endpoint value for a matched, corresponding U,V Transition value;
   e. Means for generating a Key Signal by dividing the distance in U,V space from Y,U,V Current and U,V Foreground by the distance in U,V space between Y,U,V Background and U,V Foreground;
   k. Means for forming a composite video signal, by proportioning the amount of Y,U,V Background to be subtracted from Y,U,V Current by using the Key Signal, and proportioning an amount of a Y,U,V Insert to be added to Y,U,V Current by using the Key Signal.

17. An apparatus as in claim 16 in which said means for storing a list of U,V Transition values includes means for drawing a closed polygon boundary in U,V space, designating all pels within that polygon as transition pels, and in which U,V Foreground for a particular transition pel represents an intersection of a line drawn from the U,V value of Y,U,V Background through the transition pel to the polygon boundary.

18. An apparatus as in claim 16 in which said means for storing a list of U,V Transition values includes: means for drawing an enclosed area directly on a video display of the foreground image; means for designating all pels within a predetermined radius of each color value found within that area as transition pels; and, means for designating as U,V Foreground the farthest pel in that area from the U,V value of Y,U,V Background.

* * * * *